US008209576B2

(12) United States Patent
Zhang

(10) Patent No.: US 8,209,576 B2
(45) Date of Patent: Jun. 26, 2012

(54) DYNAMIC ADJUSTMENT AND SIGNALING OF DOWNLINK/UPLINK ALLOCATION RATIO IN LTE/TDD SYSTEMS

(75) Inventor: Wenfeng Zhang, San Diego, CA (US)

(73) Assignee: ZTE (USA) Inc., Iselin, NJ (US)

( * ) Notice: Subject to any disclaimer, the term of this patent is extended or adjusted under 35 U.S.C. 154(b) by 740 days.

(21) Appl. No.: 12/410,350

(22) Filed: Mar. 24, 2009

(65) Prior Publication Data

US 2009/0249153 A1 Oct. 1, 2009

Related U.S. Application Data

(60) Provisional application No. 61/039,072, filed on Mar. 24, 2008, provisional application No. 61/138,896, filed on Dec. 18, 2008.

(51) Int. Cl.
*H03M 13/00* (2006.01)

(52) U.S. Cl. .................................... 714/748; 370/338

(58) Field of Classification Search .......... 714/748–751, 714/752, 755, 774, 784, 786, 815, 821
See application file for complete search history.

(56) References Cited

U.S. PATENT DOCUMENTS

| 5,933,421 | A | 8/1999 | Alamouti et al. | |
|---|---|---|---|---|
| 6,016,311 | A | 1/2000 | Gilbert et al. | |
| 7,877,061 | B2 * | 1/2011 | Klein et al. | 455/63.1 |
| 7,953,049 | B2 * | 5/2011 | Nilsson et al. | 370/336 |
| 8,036,145 | B2 * | 10/2011 | Power et al. | 370/280 |
| 2005/0259629 | A1 | 11/2005 | Oliver et al. | |
| 2008/0076438 | A1 | 3/2008 | Chang et al. | |
| 2008/0095106 | A1 * | 4/2008 | Malladi et al. | 370/329 |
| 2011/0002320 | A1 * | 1/2011 | Yuk et al. | 370/338 |
| 2011/0051848 | A1 * | 3/2011 | Yuk et al. | 375/316 |

OTHER PUBLICATIONS

International Search Report for International Patent Application No. PCT/US2009/038110, mailed on Nov. 6, 2009, 11 pages.

* cited by examiner

*Primary Examiner* — Nadeem Iqbal
(74) *Attorney, Agent, or Firm* — Morrison & Foerster LLP

(57) ABSTRACT

A method for dynamic adjustment of downlink/uplink resource allocation ratio in a long-term evolution (LTE) time division duplex (TDD) system is disclosed. The method includes replacing at least one of an uplink subframe and a downlink subframe with a mute subframe in a subframe pattern, indicating a first downlink/uplink resource allocation ratio. Thereafter, the mute subframe is replaced with either the uplink subframe or the downlink subframe to form another subframe pattern. The subframe pattern including the mute subframe is obtained from a lookup table, such that the replacing the mute subframe results in the other pattern. A data transmission in accordance with the other subframe pattern, indicating a second downlink/uplink resource allocation ratio, may be scheduled. Hybrid Automatic Repeat-request (HARQ) processing may be implemented after the at least one of the uplink subframe and the downlink subframe is replaced with the mute subframe in the first subframe pattern.

43 Claims, 9 Drawing Sheets

(a) ratio changes for 2 switch point per frame (b) ratio changes for 1 switch point per frame

DYNAMIC ADJUSTMENT AND SIGNALING OF DOWNLINK/UPLINK ALLOCATION RATIO IN LTE/TDD SYSTEMS

CROSS-REFERENCE TO RELATED APPLICATIONS

This application claims priority to U.S. Provisional Patent Application No. 61/039,072 filed on Mar. 24, 2008, entitled "Method for Signaling Downlink/Uplink Allocation Ratio Adjustment in LTE/TDD System", and U.S. Provisional Patent Application No. 61/138,896 filed Dec. 18, 2008, entitled "Method and System for Dynamic Adjustment of Downlink/Uplink Allocation Ratio in LTE/TDD System," the contents of both of which are incorporated by reference herein in their entirety.

FIELD OF THE INVENTION

The present invention relates generally to dynamic resource allocation, and more particularly to methods and systems for dynamically changing and signaling downlink-uplink allocation ratios in a Long-term Evolution (LTE) time division duplex (TDD) system.

BACKGROUND

TDD systems include the flexibility of bandwidth allocation in an unpaired frequency band, and the flexibility of choice on a downlink to uplink resource allocation ratio (referred to as "D/U ratio" herein). The latter is attractive because of the emerging traffic service types and traffic volume turbulence, both of which result in a wide range of D/U ratios. On the other hand, the requirement for system-wide synchronization is traditionally a major disadvantage of TDD systems. Under this requirement, all base stations or all user equipment must follow the same system timing to turn off a transmitter, in order to avoid overlapping between downlink and uplink signals in the overall system.

The timing requirement may weaken TDD features regarding D/U ratio flexibility. First, because all base stations and user equipments are synchronized, there can be only one D/U ratio per carrier frequency, on a system-wide basis. Second, once the D/U ratio is determined for a system, it may be too expensive to change it to other values because, before synchronously changing the D/U ratio, all transmitters have to shut off the transmission all together. The costs paid for such a "cold restart" include a huge loss of system capacity and interruption of user traffic. In addition, the monitoring and management of unfinished traffic in the entire system is expensive and time-consuming.

One previous invention provides a systematic method to accomplish two targets:

i. Live-change (without cold restart) of the D/U ratio system-widely from one value to another; and ii. Live-change (without cold restart) of the D/U ratio within a specific deployment area to a different value from one in surrounding areas.

In some LTE TDD systems, exemplary downlink-uplink allocations are specified in Table 1.

TABLE 1

Downlink-Uplink Allocations in LTE-TDD

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The subframes in LTE-TDD can be downlink subframes (D), uplink subframes (U) and special subframes (S) that includes three fields Downlink Pilot Timeslot (DwPTS), Guard Period (GP) and Uplink Pilot Timeslot (UpPTS).

It is suggested by a previous invention to specify a fourth subframe type: a mute subframe M. The mute subframe M is a special subframe that has neither a downlink signal nor an uplink signal during its full subframe duration. If the system plans to convert a certain downlink subframe to uplink or vice versa, it has to mark the subframe as a mute subframe M first. Once the downlink or uplink subframe is marked as a mute subframe M, it shall not be used for any transmission until it is marked as either a downlink subframe or an uplink subframe again. The system can assign the mute subframe that is originally a downlink (or uplink) subframe to be used as an uplink (or downlink) subframe. With the creation of a mute subframe M, the network could change the D/U ratio either system-wide or only for certain deployment areas.

The D/U allocation change has some logic impact to existing Hybrid Automatic Repeat-request (HARQ) timing specifications in LTE-TDD systems. HARQ is the process by which the traffic transmission is acknowledged by the receiver end, which sends ACK/NAK signaling on an opposite communication link, such that traffic retransmission may be triggered upon negative acknowledgement (NAK). The delay between traffic (re)transmission and acknowledge feedback (ACK/NAK) is predetermined. In addition, the delay between negative acknowledgement (NAK) and retransmission is also predetermined on the LTE uplink.

According to LTE specifications, user equipment (UE) shall transmit ACK/NAK in uplink subframe $n_U$ for traffic transmissions on physical downlink shared channel (PDSCH) in subframe $n_U-k$, where $k \in K$ and K (defined in Table 2) is called a downlink association index set of M elements $\{k_0, k_1, L \ k_{M-1}\}$ depending on the subframe $n_U$ and the UL-DL configuration. TDD ACK/NAK bundling and multiplexing is performed by a logical AND operation of all individual ACK/NAKs corresponding to HARQ packets across multiple downlink subframes (ACK/NAK bundling) or HARQ packets across single downlink subframe.

According to LTE specifications, the UE shall transmit a new data packet or re-transmit an old data packet on a physical uplink shared channel (PUSCH) in subframe $n_D+k_{PUSCH}$ upon a scheduling command or negative ACK/NAK in downlink subframe $n_D$; the UE shall expect ACK/NAK on a physical HARQ indication channel (PHICH) in downlink subframe $n_U+k_{PHICH}$ for its traffic (re)transmission on PUSCH in subframe $n_U$. $k_{PUSCH}$ and $k_{PHICH}$ are defined in Table 3.

TABLE 2

DL HARQ timing in LTE

| UL-DL allocations | ACK/NAK Subframe $n_I$: PDSCH in subframe $n_I - k$ | | | | | | | | | |
|---|---|---|---|---|---|---|---|---|---|---|
| | 0 | 1 | 2 | 3 | 4 | 5 | 6 | 7 | 8 | 9 |
| C0 | — | — | 6 | — | 4 | — | — | 6 | — | 4 |
| C1 | — | — | 7, 6 | 4 | — | — | — | 7, 6 | 4 | — |
| C2 | — | — | 8, 7, 4, 6 | — | — | — | — | 8, 7, 4, 6 | — | — |
| C3 | — | — | 7, 6, 11 | 6, 5 | 5, 4 | — | — | — | — | — |
| C4 | — | — | 12, 8, 7, 11 | 6, 5, 4, 7 | — | — | — | — | — | — |
| C5 | — | — | TBD | — | — | — | — | — | — | — |
| C6 | — | — | 7 | 7 | 5 | — | — | 7 | 7 | — |

TABLE 3

UL HARQ timing in LTE

| TDD UL/DL allocations | $k_{PUSCH}$ for DL subframe number $n_D$: (PUSCH in subframe $n_D + k_{PUSCH}$) | | | | | | | | | | $k_{PHICH}$ for UL subframe number $n_U$: (PHICH in subframe $n_U + k_{PHICH}$) | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| C0 | 4 | 6 | — | — | — | 4 | 6 | — | — | — | — | — | 4 | 7 | 6 | — | — | 4 | 7 | 6 |
| C1 | — | 6 | — | — | 4 | — | 6 | — | — | 4 | — | — | 4 | 6 | — | — | — | 4 | 6 | — |
| C2 | — | — | 4 | — | — | — | — | 4 | — | — | — | — | 6 | — | — | — | — | 6 | — | — |
| C3 | 4 | — | — | — | — | — | 4 | 4 | — | — | — | — | 6 | 6 | 6 | — | — | — | — | — |
| C4 | — | — | — | — | — | — | 4 | 4 | — | — | — | — | 6 | 6 | — | — | — | — | — | — |
| C5 | — | — | — | — | — | — | 4 | — | — | — | — | — | 6 | — | — | — | — | — | — | — |
| C6 | 7 | 7 | — | — | — | 7 | 7 | — | — | 5 | — | — | 4 | 6 | 6 | — | — | 4 | 7 | — |

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a method for dynamic adjustment of downlink/uplink resource allocation ratio in a long-term evolution (LTE) time division duplex (TDD) system. The method may include replacing at least one of an uplink subframe and a downlink subframe in a first subframe pattern with at least one mute subframe to form a second subframe pattern; scheduling a first data transmission in accordance with the second subframe pattern, indicating a first downlink/uplink resource allocation ratio; replacing the at least one mute subframe, within the second subframe pattern, with either the uplink subframe or the downlink subframe to form a predetermined third subframe pattern; and scheduling a second data transmission in accordance with the predetermined third subframe pattern indicating a second downlink/uplink resource allocation ratio. The second subframe pattern is obtained from a lookup table, such that the replacing the mute subframe results in the predetermined third subframe pattern.

According to certain embodiments, the method may further include implementing Hybrid Automatic Repeat-request (HARQ) processing after the at least one of the uplink subframe and the downlink subframe is replaced with the mute subframe in the first subframe pattern.

Another embodiment is directed to a station configured for dynamic adjustment of downlink/uplink resource allocation ratio in a LTE TDD system. The station includes a processor configured for replacing at least one of an uplink subframe and a downlink subframe in a first subframe pattern with at least one mute subframe to form a second subframe pattern, and replacing the at least one mute subframe, within the second subframe pattern, with either the uplink subframe or the downlink subframe to form a predetermined third subframe pattern; and a scheduler configured for scheduling a first data transmission in accordance with the second subframe pattern, indicating a first downlink/uplink resource allocation ratio, and scheduling a second data transmission in accordance with the predetermined third subframe pattern indicating a second downlink/uplink resource allocation ratio. The second subframe pattern is obtained from a lookup table, such that the replacing the mute subframe results in the predetermined third subframe pattern. According to certain embodiments, the station may be a base station in the LTE TDD system.

Yet another embodiment is directed to a computer-readable medium storing instructions thereon performing a method dynamic adjustment of downlink/uplink resource allocation ratio in a LTE TDD system. The method may include replacing at least one of an uplink subframe and a downlink subframe in a first subframe pattern with at least one mute subframe to form a second subframe pattern; scheduling a first data transmission in accordance with the second subframe pattern, indicating a first downlink/uplink resource allocation ratio; replacing the at least one mute subframe, within the second subframe pattern, with either the uplink subframe or the downlink subframe to form a predetermined third subframe pattern; and scheduling a second data transmission in accordance with the predetermined third subframe pattern indicating a second downlink/uplink resource allocation ratio. The second subframe pattern is obtained from a lookup table, such that the replacing the mute subframe results in the predetermined third subframe pattern.

The method, according to certain embodiments, may further include implementing Hybrid Automatic Repeat-request (HARQ) processing after the at least one of the uplink subframe and the downlink subframe is replaced with the mute subframe in the first subframe pattern.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
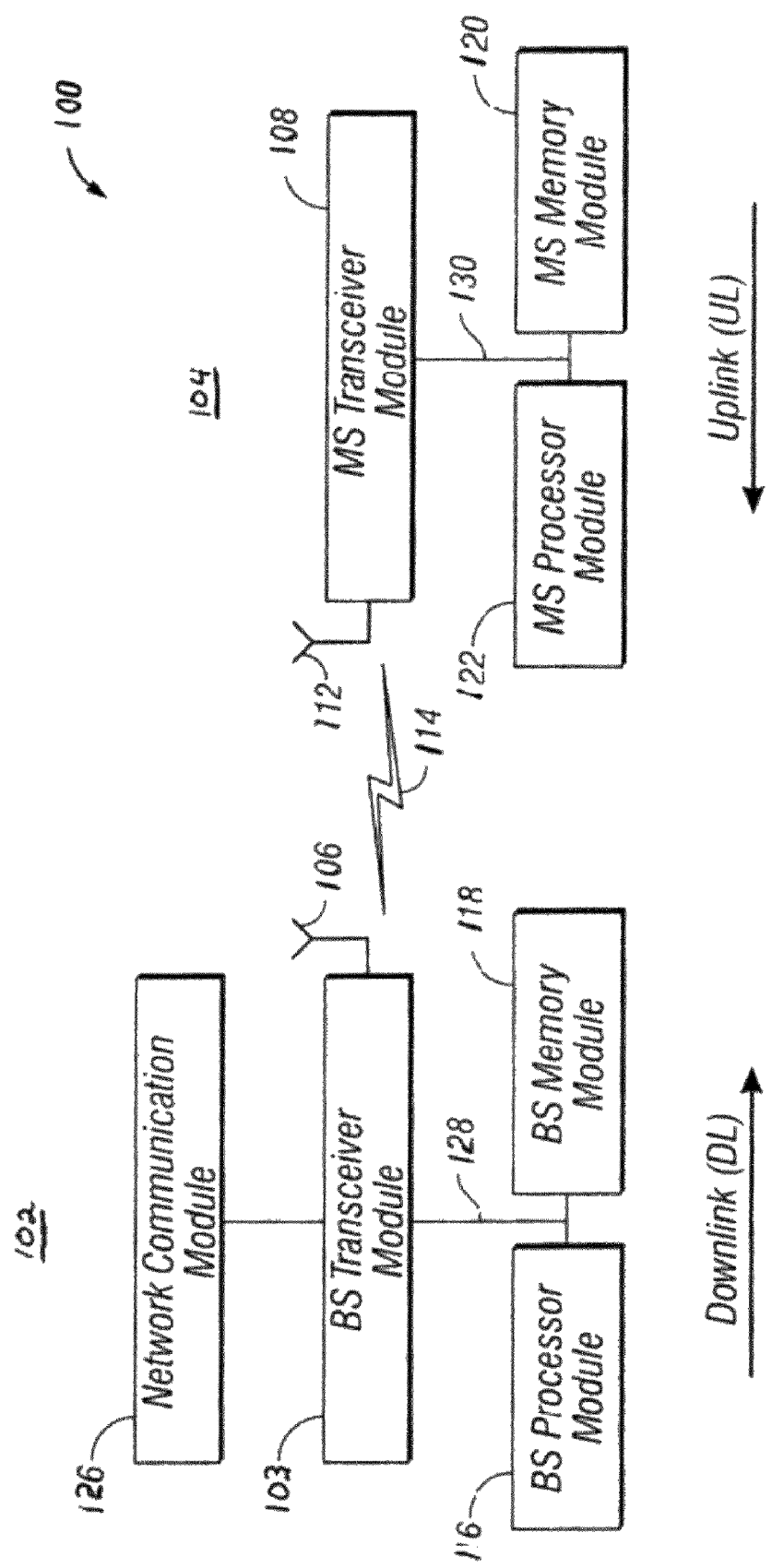
FIG. 1 shows an exemplary wireless communication system for transmitting and receiving transmissions, according to an embodiment.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

FIG. 1 shows an exemplary wireless communication system 100 for transmitting and receiving transmissions, in accordance with one embodiment of the present disclosure. The system 100 may include components and elements configured to support known or conventional operating features that need not be described in detail herein. System 100 generally comprises a base station 102 with a base station transceiver module 103, a base station antenna 106, a base station processor module 116 and a base station memory module 118. System 100 generally comprises a mobile station 104 with a mobile station transceiver module 108, a mobile station antenna 112, a mobile station memory module 120, a mobile station processor module 122, and a network communication module 126. Of course both base station 102 and mobile station 104 may include additional or alternative modules without departing from the scope of the present invention. Further, only one base station 102 and one mobile station 104 is shown in the exemplary system 100; however, any number of base stations 102 and mobile stations 104 could be included.

These and other elements of system 100 may be interconnected together using a data communication bus (e.g., 128, 130), or any suitable interconnection arrangement. Such interconnection facilitates communication between the various elements of wireless system 200. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

In the exemplary system 100, the base station transceiver 103 and the mobile station transceiver 108 each comprise a transmitter module and a receiver module (not shown). Additionally, although not shown in this figure, those skilled in the art will recognize that a transmitter may transmit to more than one receiver, and that multiple transmitters may transmit to the same receiver. In a TDD system, transmit and receive timing gaps exist as guard bands to protect against transitions from transmit to receive and vice versa.

In the particular example 1 system depicted in FIG. 1, an "uplink" transceiver 108 includes a transmitter that shares an antenna with an uplink receiver. A duplex switch may alternatively couple the uplink transmitter or receiver to the uplink antenna in time duplex fashion. Similarly, a "downlink" transceiver 103 includes a receiver which shares a downlink antenna with a downlink transmitter. A downlink duplex switch may alternatively couple the downlink transmitter or receiver to the downlink antenna in time duplex fashion.

The mobile station transceiver 108 and the base station transceiver 103 are configured to communicate via a wireless data communication link 114. The mobile station transceiver 108 and the base station transceiver 102 cooperate with a suitably configured RF antenna arrangement 106/112 that can support a particular wireless communication protocol and modulation scheme. In the exemplary embodiment, the mobile station transceiver 108 and the base station transceiver 102 are configured to support industry standards such as the Third Generation Partnership Project Long Term Evolution (3GPP LTE), Third Generation Partnership Project 2 Ultra Mobile Broadband (3Gpp2 UMB), Time Division-Synchronous Code Division Multiple Access (TD-SCDMA), and Wireless Interoperability for Microwave Access (WiMAX), and the like. The mobile station transceiver 108 and the base station transceiver 102 may be configured to support alternate, or additional, wireless data communication protocols, including future variations of IEEE 802.16, such as 802.16e, 802.16m, and so on.

According to certain embodiments, the base station 102 controls the radio resource allocations and assignments, and the mobile station 104 is configured to decode and interpret the allocation protocol. For example, such embodiments may be employed in systems where multiple mobile stations 104 share the same radio channel which is controlled by one base station 102. However, in alternative embodiments, the mobile station 104 controls allocation of radio resources for a particular link, and could implement the role of radio resource controller or allocator, as described herein.

Processor modules 116/122 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. Processor modules 116/122 comprise processing logic that is configured to carry out the functions, techniques, and processing tasks associated with the operation of system 100. In particular, the processing logic is configured to support the frame structure parameters described herein. In practical embodiments the processing logic may be resident in the base station and/or may be part of a network architecture that communicates with the base station transceiver 103.

The steps of a method or algorithm described in connection with the embodiments disclosed herein may be embodied directly in hardware, in firmware, in a software module executed by processor modules 116/122, or in any practical combination thereof. A software module may reside in memory modules 118/120, which may be realized as RAM memory, flash memory, ROM memory, EPROM memory, EEPROM memory, registers, a hard disk, a removable disk, a CD-ROM, or any other form of storage medium known in the art. In this regard, memory modules 118/120 may be coupled to the processor modules 118/122 respectively such that the processors modules 116/120 can read information from, and write information to, memory modules 118/120. As an example, processor module 116, and memory modules 118, processor module 122, and memory module 120 may reside in their respective ASICs. The memory modules 118/120 may also be integrated into the processor modules 116/120. In an embodiment, the memory module 118/220 may include a cache memory for storing temporary variables or other intermediate information during execution of instructions to be executed by processor modules 116/222. Memory modules 118/120 may also include non-volatile memory for storing instructions to be executed by the processor modules 116/120.

Memory modules 118/120 may include a frame structure database (not shown) in accordance with an exemplary embodiment of the invention. Frame structure parameter databases may be configured to store, maintain, and provide data as needed to support the functionality of system 100 in the manner described below. Moreover, a frame structure database may be a local database coupled to the processors 116/122, or may be a remote database, for example, a central network database, and the like. A frame structure database may be configured to maintain, without limitation, frame structure parameters as explained below. In this manner, a frame structure database may include a lookup table for purposes of storing frame structure parameters.

The network communication module 126 generally represents the hardware, software, firmware, processing logic, and/or other components of system 100 that enable bi-directional communication between base station transceiver 103, and network components to which the base station transceiver 103 is connected. For example, network communication module 126 may be configured to support internet or WiMAX traffic. In a typical deployment, without limitation, network communication module 126 provides an 802.3 Ethernet interface such that base station transceiver 103 can communicate with a conventional Ethernet based computer network. In this manner, the network communication module 126 may include a physical interface for connection to the computer network (e.g., Mobile Switching Center (MSC)).

On both downlink and uplink, the radio signal transmissions over the time are divided into periodic frames (or subframes, slots, etc). Each radio frame contains multiple time symbols that include data symbols (DS) and reference symbols (RS). Data symbols carry the data information, while the reference symbols are known at both transmitter and receiver, and are used for channel estimation purposes. Note that the functions described in the present disclosure may be performed by either a base station 102 or a mobile station 104. A mobile station 104 may be any user device such as a mobile phone, and a mobile station may also be referred to as user equipment (UE).

Embodiments disclosed herein have specific application but not limited to the Long Term Evolution (LTE) system that is one of the candidates for the 4-th generation wireless system. In LTE systems, for example, there may be two uplink controlling messages that are needed to transmit from the mobile station 104 to the base station 102. One of them is ACK/NACK signaling, which serves as the acknowledgement to the downlink HARQ transmission. One bit ACK/NACK corresponds to one downlink HARQ channel to indicate whether the latest packet on that downlink HARQ channel is successfully received or not. An ACK is sent upon successful reception of downlink HARQ packet, otherwise NACK is sent. There can be either one bit ($N_{ACK}=1$) or two bits ($N_{ACK}=2$) ACK/NACK per ACK/NACK message in LTE systems.

Figure 2:
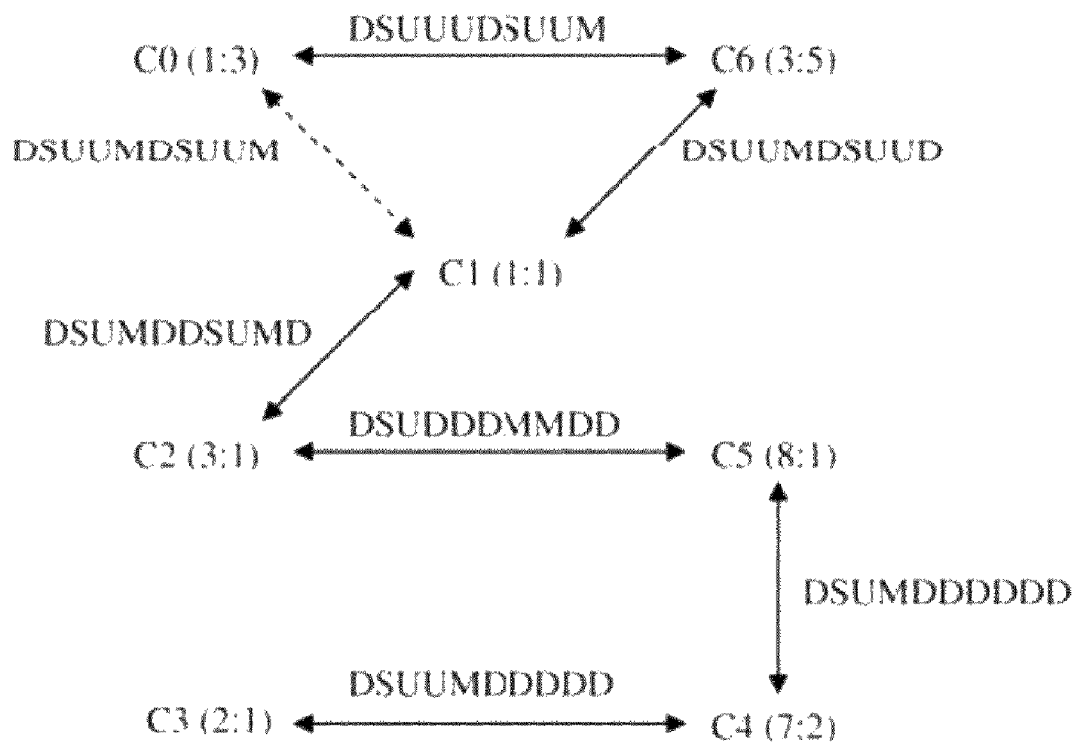
FIG. 2 summarizes downlink-uplink allocation ratio changes with two subframes involved, according to an embodiment.

According to one embodiment of the disclosure, the LTE/TDD D/U ratios that are shown in Table 1 can be changed from one to another by using the mute subframe M, as shown in FIG. 2, where Ci represents the i-th allocation configuration in Table 1. The mute subframe M patterns used in either intermediate transit process or intermediate tier are also shown in FIG. 2. Note that FIG. 2 shows the ratio adjustments that involve no more than two mute subframes; however this is merely for exemplary purposes and one of skill in the art would realize that the present disclosure is not limited to such adjustments.

As shown in FIG. 2, the direct ratio exchange (doted line) between C0 and C1 is equivalent to the indirect ratio change (solid lines) through C6. So the direct ratio change between C0 and C1 may not be necessary in implementation. In one embodiment, one mute subframe M can be used per ratio adjustment step in order to save instantaneous system capacity. Accordingly the total number of frame patterns can be 15, which may include 7 patterns without a mute subframe M and 8 patterns with one mute subframe M. This means one extra bit is needed in the broadcast signaling to indicate a mute subframe M. According to an exemplary embodiment, these 15 patterns are binary encoded as shown in Table 4 such that:
a) The configurations 0-6 are without a mute subframe M;
b) Configuration 7 is not used;
c) There is one bit in the signaling encoding to represent the existence of a mute subframe M;
d) For i<7, the configuration (i+8) is obtained by replacing one subframe in configuration i with a mute subframe M; the configuration 15 is obtained by replacing one subframe in configuration 2 with a mute subframe M.

Figure 3:
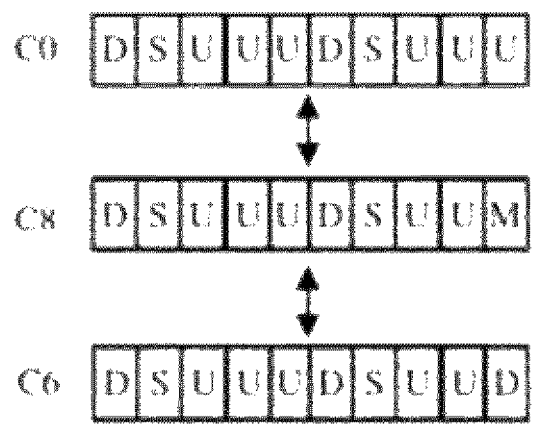
FIG. 3 shows a downlink-uplink allocation ratio change between configuration-0 and configuration-6, according to an embodiment.

FIG. 3, the last subframe in C0 (originally an uplink subframe U) is muted, which corresponds to configuration-8 (C8). Thereafter, C6 may be derived by changing the mute subframe M to a downlink subframe D. Similarly, C0 can be obtained from C6, through C8.

Figure 4:
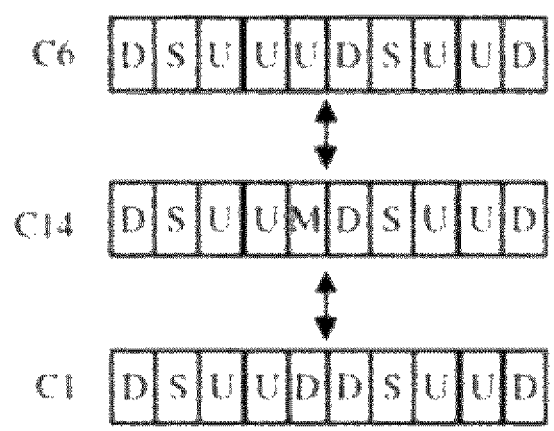
FIG. 4 shows a downlink-uplink allocation ratio change between configuration-6 and configuration-1, according to an embodiment.

FIG. 4 shows a downlink-uplink allocation ratio change between C6 and configuration-1 (C1), according to an embodiment. As shown in FIG. 4, the fifth subframe in C6 (originally an uplink subframe U) is muted, which corresponds to configuration-14 (C14). Thereafter, C1 may be derived by changing the mute subframe M to a downlink subframe D. Similarly, C6 can be obtained from C1 through C14.

Figure 5:
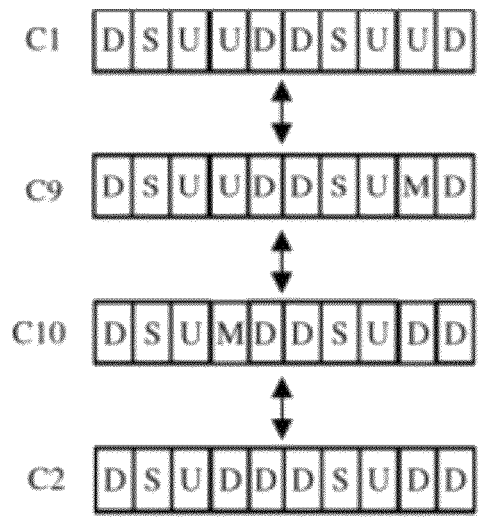
FIG. 5 shows a downlink-uplink allocation ratio change between configuration-1 and configuration-2, according to an embodiment.

FIG. 5 shows a downlink-uplink allocation ratio change between C1 and configuration-2 (C2), according to an embodiment. As shown in FIG. 5, the ninth subframe in C1 (originally an uplink subframe U) is muted, which corresponds to configuration-9 (C9). Changing the mute subframe M to a downlink subframe D, and muting the fourth subframe (originally an uplink subframe U) produces configuration-10 (C10). Thereafter, C2 may be derived by changing the mute subframe M to a downlink subframe D. Similarly, C1 can be obtained from C2 through C9 and C10.

Figure 6:
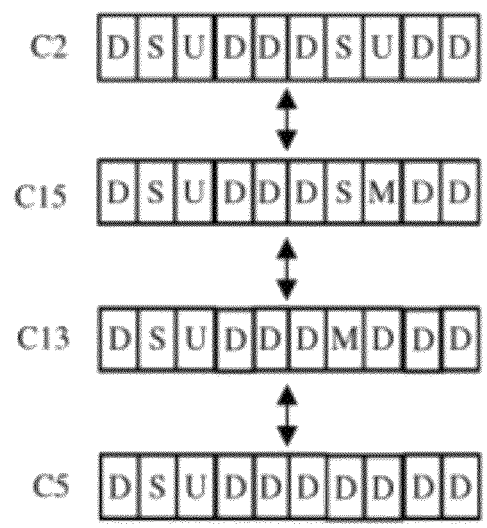
FIG. 6 shows a downlink-uplink allocation ratio change between configuration-2 and configuration-5, according to an embodiment.

FIG. 6 shows a downlink-uplink allocation ratio change between C2 and configuration-S (C5), according to an embodiment. As shown in FIG. 6, the eighth subframe in C2 (originally an uplink subframe U) is muted, which corresponds to C15. Changing the mute subframe M to a downlink subframe D, and muting the seventh subframe (originally a special subframe S) produces configuration-13 (C13). Thereafter, C5 may be derived by changing the mute subframe M to a downlink subframe D. Similarly, C2 can be obtained from C5 through C15 and C13.

Figure 7:
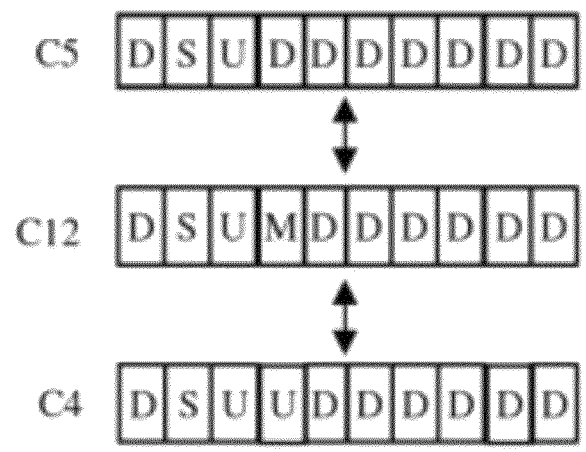
FIG. 7 shows a downlink-uplink allocation ratio change between configuration-5 and configuration-4, according to an embodiment.

FIG. 7 shows a downlink-uplink allocation ratio change between C5 and configuration-4 (C4), according to an embodiment. As shown in FIG. 7, the fourth subframe in C5 (originally a downlink subframe D) is muted, which corresponds to configuration-12 (C12). Thereafter, C4 may be

TABLE 4

Downlink-Uplink Allocations with Mute Subframes

| Configuration | Signaling coding (4 bits) | Switch-point periodicity | Subframe patterns | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 0000 | 5 ms | D | S | U | U | U | D | S | U | U | U |
| 1 | 0001 | 5 ms | D | S | U | U | D | D | S | U | U | D |
| 2 | 0010 | 5 ms | D | S | U | D | D | D | S | U | D | D |
| 3 | 0011 | 10 ms | D | S | U | U | U | D | D | D | D | D |
| 4 | 0100 | 10 ms | D | S | U | U | D | D | D | D | D | D |
| 5 | 0101 | 10 ms | D | S | U | D | D | D | D | D | D | D |
| 6 | 0110 | 10 ms | D | S | U | U | U | D | S | U | U | D |
| 7 | 0111 | Not Used | | | | | | | | | | |
| 8 | 1000 | 5 ms | D | S | U | U | U | D | S | U | U | M |
| 9 | 1001 | 5 ms | D | S | U | U | D | D | S | U | M | D |
| 10 | 1010 | 5 ms | D | S | U | M | D | D | S | U | D | D |
| 11 | 1011 | 10 ms | D | S | U | U | M | D | D | D | D | D |
| 12 | 1100 | 10 ms | D | S | U | M | D | D | D | D | D | D |
| 13 | 1101 | 10 ms | D | S | U | D | D | M | D | D | D | D |
| 14 | 1110 | 10 ms | D | S | U | U | M | D | S | U | U | D |
| 15 | 1111 | 5 ms | D | S | U | D | D | D | S | M | D | D |

In this manner, using the allocation assignments shown in Table 4, all the D/U ratio adjustments shown in FIG. 2 can be implemented as shown in FIGS. 3-8.

Referring to FIG. 3, a downlink-uplink allocation ratio change between configuration-0 (C0) and configuration-6 (C6) is depicted, according to an embodiment. As shown in derived by changing the mute subframe M to an uplink subframe U. Similarly, C5 can be obtained from C4 through C12.

Figure 8:
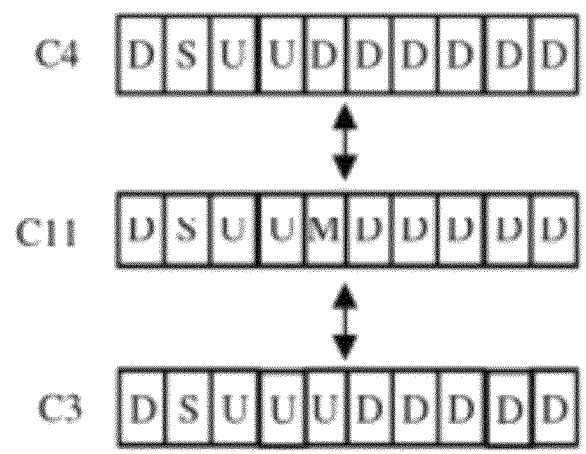
FIG. 8 shows a downlink-uplink allocation ratio change between configuration-4 and configuration-3, according to an embodiment.

FIG. 8 shows a downlink-uplink allocation ratio change between C4 and configuration-3 (C3), according to an embodiment. As shown in FIG. 8, the fifth subframe in C4 (originally a downlink subframe D) is muted, which corresponds to configuration-11 (C11). Thereafter, C3 may be derived by changing the mute subframe M to an uplink subframe U. Similarly, C4 can be obtained from C3 through C11.

Figure 9:
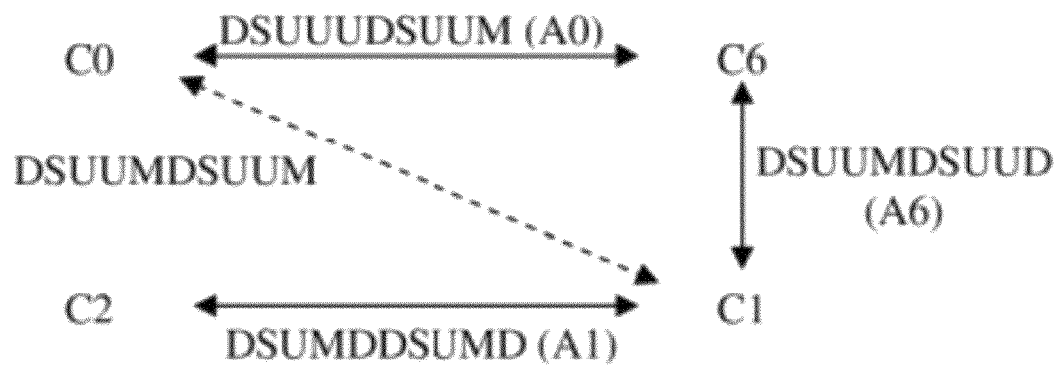
FIGS. 9(a) and 9(b) summarize downlink-uplink allocation ratio changes with two and one switch points per frame, respectively, according to an embodiment.
Figure 9:
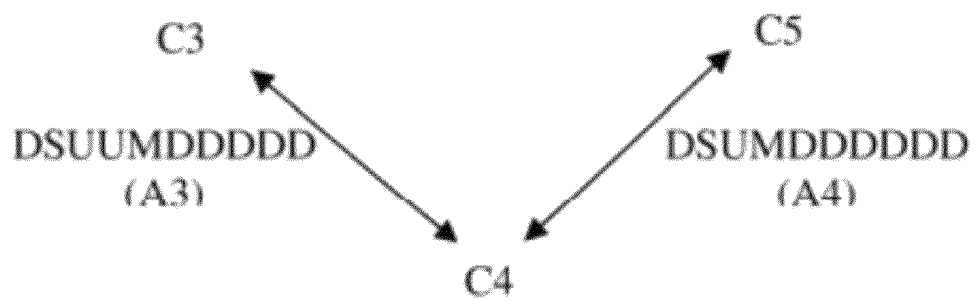

Besides the solution given above with the 15 configurations including 8 configurations each of which having as many as one mute subframe M, there may be another solution in which the new configurations that may have more than one mute subframe are treated as special variations of certain configurations without mute subframes M. This method is driven by the following assumptions that may be made in LTE standard development: the downlink signal cannot be muted, and early release LTE terminals may only recognize configurations 0-6. According to certain embodiments, these assumptions also mean that the allocations with a 5 ms switch point period and allocations with a 10 ms switch point period cannot be exchanged with each other. Table 5 lists downlink-uplink allocations including those that support live-change of allocations, and shows the new allocation Ak {k=0, 1, 3, 4, 6} with mute subframe M obtained from existing allocation Ck by setting a set of uplink subframes {Ui} in allocation Ck as the mute subframe(s) M, where "Ui" refer to the uplink subframe whose subframe offset is i, by counting the first subframe in the radio frame as subframe 0. Correspondingly, FIGS. 9(a) and 9(b) summarize downlink-uplink allocation ratio changes with two and one switch points per frame, respectively, according to an embodiment.

ter, C2 may be derived by changing the mute subframes M to downlink subframes D. Similarly, C1 can be obtained from C2 through A1.

Figure 13:
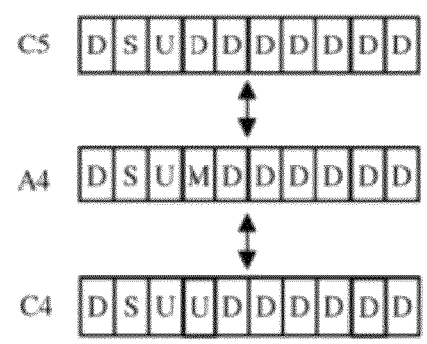
FIG. 13 shows a downlink-uplink allocation ratio change between configuration-5 and configuration-4, according to an embodiment.

FIG. 13 shows a downlink-uplink allocation ratio change between configuration-5 (C5) and configuration-4 (C4), according to an embodiment. As shown in FIG. 13, the fourth subframe in C5 (originally a downlink subframe D) is muted, which corresponds to allocation-4 (A4). Thereafter, C4 may be derived by changing the mute subframe M to an uplink subframe U. Similarly, C5 can be obtained from C4 through A4.

Figure 14:
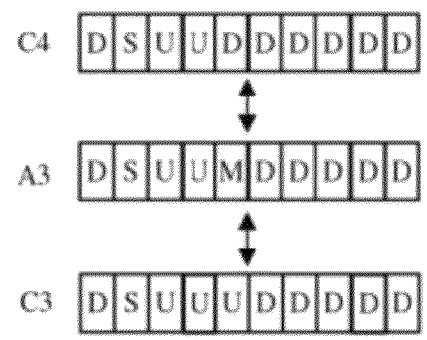
FIG. 14 shows a downlink-uplink allocation ratio change between configuration-4 and configuration-3, according to an embodiment.

FIG. 14 shows a downlink-uplink allocation ratio change between C4 and configuration-3 (C3), according to an embodiment. As shown in FIG. 14, the fifth subframe in C4 (originally a downlink subframe D) is muted, which corresponds to allocation-3 (A3). Thereafter, C3 may be derived by changing the mute subframe M to an uplink subframe U. Similarly, C4 can be obtained from C3 through A3.

There are two exemplary solutions, namely a scheduling-control solution and a signaling-control solution, to implement subframe-muting control mechanisms based on allocation definition in Table 5, according to certain embodiments of the present disclosure. Of course, other solutions within the scope of the present disclosure may be apparent to those of ordinary skill in the art.

TABLE 5

All allowed TDD downlink-uplink allocations

| | Downlink-uplink allocations | Subframe patterns | | | | | | | | | |
|---|---|---|---|---|---|---|---|---|---|---|---|
| | | 0 | 1 | 2 | 3 | 4 | 5 | 6 | 7 | 8 | 9 |
| Curent D/U allocations | C0 | D | S | U | U | U | D | S | U | U | U |
| | C1 | D | S | U | U | D | D | S | U | U | D |
| | C2 | D | S | U | D | D | D | S | U | D | D |
| | C3 | D | S | U | U | U | D | D | D | D | D |
| | C4 | D | S | U | U | D | D | D | D | D | D |
| | C5 | D | S | U | D | D | D | D | D | D | D |
| | C6 | D | S | U | U | U | D | S | U | U | D |
| D/U allocations w/ mute subframe | A0: mute U9 in C0 | D | S | U | U | U | D | S | U | U | M |
| | A1: mute U3, U8 in C1 | D | S | U | M | D | D | S | U | M | D |
| | A3: mute U4 in C3 | D | S | U | U | M | D | D | D | D | D |
| | A4: mute U3 in C4 | D | S | U | M | D | D | D | D | D | D |
| | A6: mute U4 in C6 | D | S | U | U | M | D | S | U | U | D |

Figure 10:
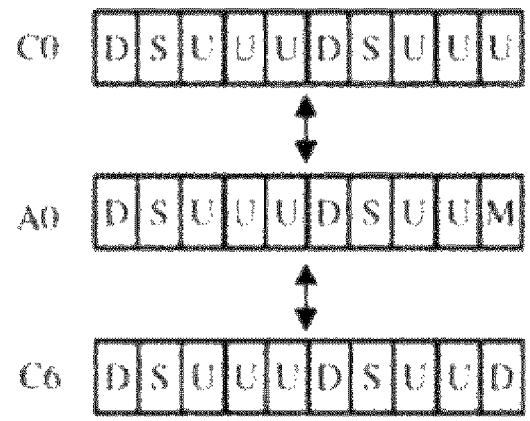
FIG. 10 shows a downlink-uplink allocation ratio change between configuration-0 and configuration-6, according to an embodiment.

FIG. 10 shows a downlink-uplink allocation ratio change between configuration-0 (C0) and configuration-6 (C6), according to an embodiment, with reference to Table 5 and FIGS. 9(a) and 9(b). As shown in FIG. 10, the last subframe in C0 (originally an uplink subframe U) is muted, which corresponds to allocation-0 (A0). Thereafter, C6 may be derived by changing the mute subframe M to a downlink subframe D. Similarly, C0 can be obtained from C6 through A0.

Figure 11:
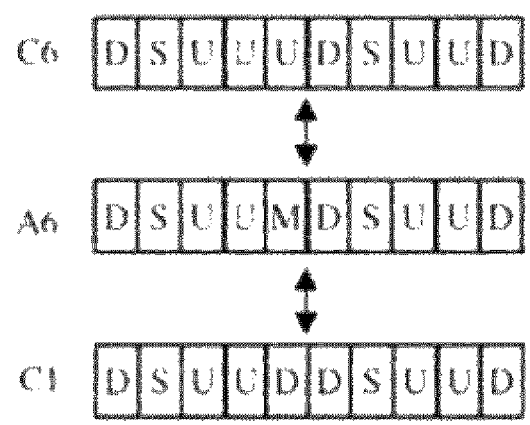
FIG. 11 shows a downlink-uplink allocation ratio change between configuration-6 and configuration-1, according to an embodiment.

FIG. 11 shows a downlink-uplink allocation ratio change between C6 and configuration-1 (C1), according to an embodiment. As shown in FIG. 11, the fifth subframe in C6 (originally an uplink subframe U) is muted, which corresponds to allocation-6 (A6). Thereafter, C1 may be derived by changing the mute subframe M to a downlink subframe D. Similarly, C6 can be obtained from C1 through A6.

Figure 12:
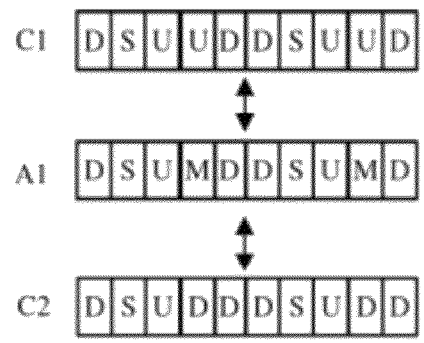
FIG. 12 shows a downlink-uplink allocation ratio change between configuration-1 and configuration-2, according to an embodiment.

FIG. 12 shows a downlink-uplink allocation ratio change between C1 and configuration-2 (C2), according to an embodiment. As shown in FIG. 12, both the fourth and the ninth subframes in C1 (originally both uplink subframes U) are muted, which corresponds to allocation-1 (A1). Thereaf- Scheduling-Control Solution In the scheduling-control solution, according to certain embodiments, the downlink and uplink HARQ processes with the mute subframe M may be implemented under the condition that an LTE terminal (e.g., UE or mobile station 104) is unaware of the existence of the muted subframe M and the muting operation is achieved by scheduling in the base station 102, that is:

For downlink HARQ, the base station 102 does not schedule UE in the downlink subframe that can have an ACK/NAK in a muted UL subframe. The resultant downlink HARQ timing is shown in Table 6, where those unscheduled downlink subframes are highlighted;

For UL HARQ, the base station 102 sends positive ACK, regardless of a PUSCH decoding result, at a feedback instance to stop upcoming traffic transmission in the muted UL subframe, as shown in Table 7, where those feedback instances holding constant positive ACK are highlighted. In addition, base station 102 may not schedule semi-persistent uplink traffic transmission that may pass through a muted UL subframe, according to certain embodiments.

TABLE 6

DL HARQ timing in scheduling-control solution

| UL-DL allocations | Configuration in BCCH | ACK/NAK in Subframe $n_U$:PDSCH in subframe $n_U$-k | | | | | | | | | |
|---|---|---|---|---|---|---|---|---|---|---|---|
| | | 0 | 1 | 2 | 3 | 4 | 5 | 6 | 7 | 8 | 9 |
| C0 | | - | - | 6 | | 4 | - | - | 6 | | 4 |
| A0 | C0 | - | - | 6 | | 4 | | - | 6 | | M |
| C6 | | - | - | 7 | 7 | 5 | - | - | 7 | 7 | - |
| A6 | C6 | - | - | 7 | 7 | M | - | - | 7 | 7 | |
| C1 | | - | - | 7,6 | 4 | - | - | - | 7,6 | 4 | - |
| A1 | C1 | - | - | 7,6 | M | | - | - | 7,6 | M | |
| C2 | | - | - | 8,7,4,6 | - | - | - | - | 8,7,4,6 | - | - |
| C5 | | - | - | TBD | - | - | - | - | - | - | - |
| A4 | C4 | - | - | 12,8,7,11 | M | - | - | | | | |
| C4 | | - | - | 12,8,7,11 | 6,5,4,7 | - | - | | | | |
| A3 | C3 | | - | 7,6,11 | 6,5 | M | - | - | - | - | |
| C3 | | - | - | 7,6,11 | 6,5 | 5,4 | - | - | | | |

TABLE 7

UL HARQ timing in scheduling-control solution

| TDD UL/DL allocations | Configuration in BCCH | $k_{PUSCH}$ for DL subframe number $n_D$: (PUSCH in subframe $n_D + k_{PUSCH}$) | | | | | | | | | | $k_{PHICH}$ for UL subframe number $n_U$: (PHICH in subframe $n_U + k_{PHICH}$) | | | | | | | | | |
|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 0 | 1 | 2 | 3 | 4 | 5 | 6 | 7 | 8 | 9 |
| C0 | | 4 | 6 | - | - | - | 4 | 6 | - | - | - | - | - | 4 | 7 | 6 | - | - | 4 | 7 | 6 |
| A0 | C0 | 4 | 6 | - | - | 4 | 6 | - | - | M | | - | - | 4 | 7 | 6 | - | - | 4 | 7 | M |
| C6 | | 7 | 7 | - | - | - | 7 | 7 | - | - | 5 | - | - | 4 | 6 | 6 | - | - | 4 | 7 | - |
| A6 | C6 | 7 | 7 | - | - | M | 7 | 7 | - | - | 5 | - | - | 4 | 6 | M | - | - | 4 | 7 | - |
| C1 | | | 6 | - | - | 4 | | 6 | - | - | 4 | - | - | 4 | 6 | - | - | - | 4 | 6 | - |
| A1 | C1 | | 6 | - | M | 4 | | 6 | - | M | 4 | - | - | 4 | M | - | - | - | 4 | M | - |
| C2 | | | | - | 4 | | | | - | 4 | | - | - | 6 | - | - | - | - | 6 | - | - |
| C5 | | | | - | | | | | - | 4 | | - | - | 6 | - | - | - | - | 6 | - | - |
| A4 | C4 | | | - | M | | | | 4 | 4 | - | - | 6 | M | - | - | - | - | - | - | |
| C4 | | | | - | - | | | | 4 | 4 | - | - | 6 | 6 | - | - | - | - | - | - | |
| A3 | C3 | 4 | | - | - | M | | | 4 | 4 | - | - | 6 | 6 | M | - | - | - | - | - | |
| C3 | | 4 | | - | - | | | | 4 | 4 | - | - | 6 | 6 | 6 | - | - | - | - | - | |

Signaling-Control Solution

In the signaling-control solution, according to certain embodiments, UE 104 is informed by signaling of the existence of a mute subframe M in Table 5. With the knowledge of the mute subframe M in both the base station 102 and UE 104, better HARQ timings may be arranged. In order to keep the modification to current LTE specification at a minimum, existing downlink/uplink HARQ timings may be reused as shown in Table 8 and Table 9, where "Configuration in BCCH" (BCCH stands for broadcast channel) may be interpreted by UE 104 in the same way as in the current specification and "Configuration whose timing is reused" is the TDD configuration whose HARQ timing parameters are reused when the existence of the mute subframe is signaled.

Table 8 shows that all downlink subframes are available to downlink HARQ without any ACK/NAK loss to the muted subframe M. However, for a given uplink subframe nu, there may exist k in the corresponding downlink association index set (numbers in each table entry) such that subframe $n_U$-k is not a downlink subframe under the TDD configuration specified by BCCH. Such values of k are put into "[ ]" in Table 8. To minimize the modification to current LTE specifications, positive ACK may be used in a logic AND operation of ACK/NAK bundling/multiplexing for subframe $n_U$-k if that subframe is not a downlink subframe. If all individual ACK/NAK in the logic AND operation are corresponding to non-downlink subframes, the bundled ACK/NAK is not transmitted in uplink subframe nu according to certain embodiments.

For the uplink HARQ timing, certain HARQ timing protocols that are reused from existing TDD D/U configurations are listed in Table 9, where the HARQ timing in either configuration C1 or configuration C6, for example, can be chosen as the reused timing in allocation A6. For the uplink traffic transmission in subframe nu, its ACK/NAK acknowledgement is not transmitted and is considered as a positive ACK if subframe $n_U + k_{PHICH}$, in which the ACK/NAK may fall, is not a downlink subframe. Those uplink subframes corresponding to missing but interpreted to be positive ACK/NAK are highlighted in Table 9.

TABLE 8

DL HARQ timing in signaling-control solution

| UL-DL allocations | Configuration in BCCH | Configuration whose timing is reused | ACK/NAK Subframe $n_I$: PDSCH in subframe $n_I - k$ | | | | | | | | |
|---|---|---|---|---|---|---|---|---|---|---|---|
| | | | 0 | 1 | 2 | 3 | 4 | 5 | 6 | 7 | 8 | 9 |
| C0 | | | — | — | 6 | | 4 | — | — | 6 | | 4 |
| A0 | C0 | C6 | — | — | 7 | 7 | [5] | — | — | 7 | 7 | M |
| C6 | | | — | — | 7 | 7 | 5 | — | — | 7 | 7 | — |
| A6 | C6 | C1 | — | — | 7, 6 | 4 | M | — | — | 7, 6 | [4] | — |
| C1 | | | — | — | 7, 6 | 4 | — | — | — | 7, 6 | 4 | — |
| A1 | C1 | C2 | — | — | 8, 7, [4], 6 | M | — | — | — | 8, 7, [4], 6 | M | — |
| C2 | | | — | — | 8, 7, 4, 6 | — | — | — | — | 8, 7, 4, 6 | — | — |
| C5 | | | — | — | TBD | — | — | — | — | — | — | — |
| A4 | C4 | C5 | — | — | TBD | — | — | — | — | — | — | — |
| C4 | | | — | — | 12, 8, 7, 11 | 6, 5, 4, 7 | — | — | — | — | — | — |
| A3 | C3 | C4 | — | — | 12, [8], 7, 11 | 6, 5, 4, 7 | M | — | — | — | — | — |
| C3 | | | — | — | 7, 6, 11 | 6, 5 | 5, 4 | — | — | — | — | — |

TABLE 9

UL HARQ timing in signaling-control solution

| TDD UL/DL allocations | Configuration in BCCH | Configuration whose timing is reused | $k_{PUSCH}$ for DL subframe number $n_D$: (PUSCH in subframe $n_D + k_{PUSCH}$) | | | | | | | | | | $k_{PHICH}$ for UL subframe number $n_U$: (PHICH in subframe $n_U + k_{PHICH}$) | | | | | | | | | |
|---|---|---|---|---|---|---|---|---|---|---|---|---|---|---|---|---|---|---|---|---|---|---|
| | | | 0 | 1 | 2 | 3 | 4 | 5 | 6 | 7 | 8 | 9 | 0 | 1 | 2 | 3 | 4 | 5 | 6 | 7 | 8 | 9 |
| C0 | | | 4 | 6 | - | - | - | 4 | 6 | - | - | - | - | - | 4 | 7 | 6 | - | - | 4 | 7 | 6 |
| A0 | C0 | C6 | 7 | 7 | - | - | - | 7 | 7 | - | - | M | - | - | 4 | 6 | 6 | - | - | 4 | 7 | M |
| C6 | | | 7 | 7 | - | - | - | 7 | 7 | - | - | 5 | - | - | 4 | 6 | 6 | - | - | 4 | 7 | - |
| A6 | C6 | C6 | 7 | 7 | - | - | M | 7 | 7 | - | - | [5] | - | - | 4 | 6 | M | - | - | 4 | 7 | - |
| | | or C1 | | 6 | - | - | M | | 6 | - | - | 4 | - | - | 4 | 6 | M | - | - | 4 | 6 | - |
| C1 | | | | 6 | - | - | 4 | | 6 | - | - | 4 | - | - | 4 | 6 | - | - | - | 4 | 6 | - |
| A1 | C1 | C1 | | 6 | - | M | [4] | | 6 | - | M | [4] | - | - | 4 | M | - | - | - | 4 | M | - |
| C2 | | | | | - | 4 | | | | - | 4 | | - | - | - | 6 | - | - | - | - | 6 | - |
| C5 | | | | | - | | | | | - | 4 | | - | - | - | 6 | - | - | - | - | - | - |
| A4 | C4 | C5 | | | - | M | | | | - | 4 | | - | - | - | 6 | M | - | - | - | - | - |
| C4 | | | | | - | - | | | | 4 | 4 | | - | - | 6 | 6 | - | - | - | - | - | - |
| A3 | C3 | C4 | | | - | - | M | | | 4 | 4 | | - | - | 6 | 6 | M | - | - | - | - | - |
| C3 | | | 4 | | - | - | - | | | 4 | 4 | | - | - | 6 | 6 | 6 | - | - | - | - | - |

Signaling Format

The scheduling-control solution does not require base station 102 to broadcast the existence of the mute subframe M. For the signaling-control solution, one bit may be added to the system information that is broadcast over a whole cell. According to certain embodiments, for different values of the one bit signaling, the TDD configuration x can be interpreted as either Cx in Table 5 with no mute subframe M or Ax in Table 5 with a mute subframe M for x=0, 1, 3, 4, 6. This one-bit signaling can be put into a TDD-Configuration IE (information element) that is in system information block type 1 of the LTE system.

Both scheduling-control and signaling-control solutions may face the same issue that UE 104 and base station 102 may, for a certain period of time, have different understandings regarding TDD configurations. This could happen, for example, after UE 104 performs a handoff between two cells, one of which has a mute subframe M per radio frame while another does not. The UE 104 may need a certain amount of time to successfully decode broadcast information once it connects to target cell. It may continue using within a target cell its control channel timings (HARQ timing, for example) that are valid in a source cell, until it successfully receives broadcast information in the target cell and is aware of a new TDD configuration. In order to avoid the possible inconsistent understanding of TDD allocation between UE 104 and the target cell base station 102 after UE's 104 handoff procedure, the mobility control information element should also carry the signaling to inform UE 104 of the TDD allocation as well as the mute subframe M, if any, in the target cell. One exemplary solution is to add the TDD configuration information element (with newly defined one-bit signaling) completely into the mobility control information element. However, other methods may be available to reduce the signaling overhead, within the scope of the present disclosure. Efficient signaling formats are discussed below for scheduling-control and signaling-control, respectively.

Signaling in Mobility Control IE for Scheduling-Control

In the scheduling-control solution, according to certain embodiments, the TDD allocation in the target cell could have as many as three variations relative to allocation in the source cell, so 2-bit signaling $s_1 s_0$ may be sufficient in the mobility control information element. An exemplary signaling definition is given in Table 10, where $a_0$, $a_1$, and $a_2$ are three unequal 2-bit values, for example, $a_0=00$, $a_1=01$, $a_2=10$. It should be noted that, if the absence of this signaling represents the same TDD allocations between source cell and target cell, the column for "$s_1s_0=a_0$" in Table 10 could be removed, and only one-bit signalling $s_0$ ($s_0$ absent, $s_0=b_0$, $s_0=b_1$) is sufficient to represent the TDD allocations in a target cell, as shown in Table 10. Each row in Table 10 may have its entries in the two right-most columns shuffled in other implementation variations, within the scope of the present disclosure.

TABLE 10

1-bit and 2-bit Signaling to indicate TDD allocation relations between source and target cells

| TDD configuration in source cell | TDD configuration in target cell | | |
|---|---|---|---|
| | $s_0$ absent $s_1s_0 = a_0$ | $s_0 = b_0$ $s_1s_0 = a_1$ | $s_0 = b_1$ $s_1s_0 = a_2$ |
| 0 | 0 | N/A | 6 |
| 1 | 1 | 6 | 2 |
| 2 | 2 | 1 | N/A |
| 3 | 3 | N/A | 4 |
| 4 | 4 | 3 | 5 |
| 5 | 5 | 4 | N/A |
| 6 | 6 | 0 | 1 |

Signaling in Mobility Control IE for Signaling-Control

In the signaling-control solution, each TDD allocation can be either Cx or Ax. According to certain embodiments, because the TDD allocation in the target cell could have as many as three variations based upon allocation in the source cell, for example, 2-bit signaling $s_1s_0$ is sufficient in the mobility control information element. The exemplary signaling definition is given in Table 11, where $a_0$, $a_1$ and $a_2$ are three unequal 2-bit values. For example, $a_0=00$, $a_1=01$, and $a_2=10$. It should be noted that, if the absence of this signaling represents the same TDD allocations between source cell and target cell, the column for "$s_1s_0=a_0$" in Table 11 could be removed, and only one-bit signalling $s_0$ ($s_0$ absent, $s_0=b_0$, $s_0=b_1$) is sufficient to represent the TDD allocations, as shown in Table 11. Each row in Table 11 may have its entries in the two right-most columns shuffled in other implementation variations.

TABLE 11

1-bit and 2-bit Signaling to indicate TDD allocation relations between source and target cells

| TDD allocation in source cell | TDD allocation in target cell | | |
|---|---|---|---|
| | $s_0$ absent $s_1s_0 = a_0$ | $s_0 = b_0$ $s_1s_0 = a_1$ | $s_0 = b_1$ $s_1s_0 = a_2$ |
| C0 | C0 | N/A | A0 |
| A0 | A0 | C0 | C6 |
| C1 | C1 | A6 | A1 |
| A1 | A1 | C1 | C2 |
| C2 | C2 | A1 | N/A |
| C3 | C3 | N/A | A3 |
| A3 | A3 | C3 | C4 |
| C4 | C4 | A3 | A4 |
| A4 | A4 | C4 | C5 |
| C5 | C5 | A4 | N/A |
| C6 | C6 | A0 | A6 |
| A6 | A6 | C6 | C1 |

Figure 15:
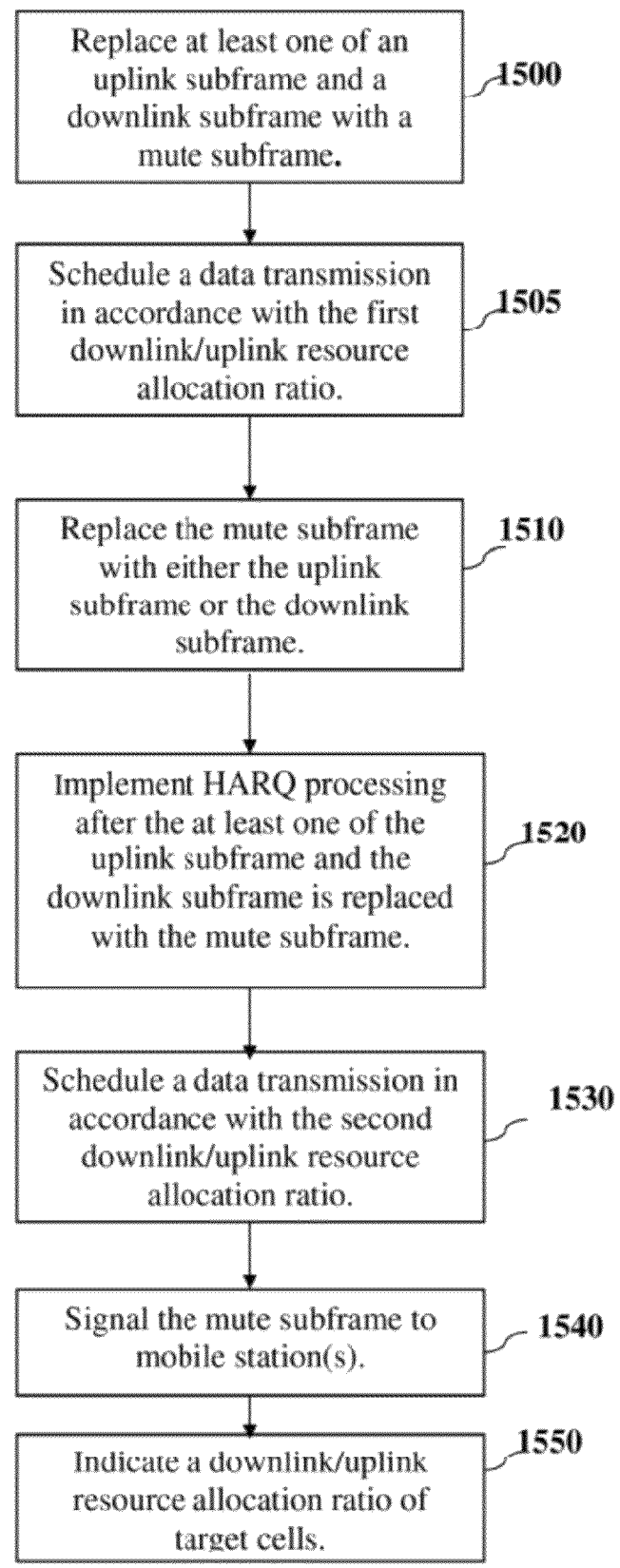
FIG. 15 is a flow diagram illustrating a method for signaling a dynamic adjustment of downlink/uplink resource allocation ratio in a LTE TDD system, according to an embodiment.

FIG. 15 is a flow diagram illustrating a method for signaling a dynamic adjustment of downlink/uplink resource allocation ratio in a long-term evolution (LTE) time division duplex (TDD) system. Referring to FIG. 15, at operation 1500 base station processor module 116, for example, replaces at least one of an uplink subframe and a downlink subframe, in a first subframe pattern, with at least one mute subframe M in a first subframe pattern, to make a second subframe pattern indicating a first downlink/uplink resource allocation ratio. At step 1510, the base station processor module 116 may also replace the mute subframe M, within the second subframe pattern, with either the uplink subframe or the downlink subframe to form a third subframe pattern. The second subframe pattern is obtained from one or more lookup tables (e.g., Table 4 or Table 5), such that the replacing the mute subframe results in the predetermined third subframe pattern. The lookup table(s) may be stored in base station memory module 118, for example, and accessed using processor module 116, for example.

At operation 1530, a scheduler (e.g., communicatively coupled to base station processor module 116, for example) schedules a data transmission in accordance with the third subframe pattern indicating a second downlink/uplink resource allocation ratio. Similarly, the scheduler can also schedule a data transmission after step 1505, in accordance with the second subframe pattern when TDD configuration stays at the first downlink/uplink resource allocation ratio, for example.

Of course, according to certain embodiment, after replacing the mute subframe M, another at least one of an uplink subframe and a downlink subframe may be replaced with a mute subframe M in the second subframe pattern, if the second subframe pattern does not indicate a desired downlink/uplink resource allocation ratio, to form a third subframe pattern; and the mute subframe M in the third subframe pattern may be replaced with either the uplink subframe or the downlink subframe to form a fourth subframe pattern. A data transmission may be scheduled in accordance with any of the four subframe patterns at the time when TDD allocation stays at the current pattern, indicating the corresponding downlink/uplink resource allocation ratio.

According to certain embodiments, at operation 1520 a HARQ processor (e.g., communicatively coupled to base station processor module 116, for example), implements HARQ processing after the at least one of the uplink subframe and the downlink subframe is replaced with the mute subframe M in the first subframe pattern. With the existence of a mute subframe M, HARQ processing may require a scheduling-control solution or a signaling-control solution, as described above, to implement uplink and downlink HARQ processes.

With a scheduling-control solution, the mute subframe M is not signaled to the mobile station(s) 104. On the other hand, with a signaling-control solution, at operation 1540, a transceiver (e.g., base station transceiver module 103 and/or a network communication module 126) signals the mute subframe M to mobile station(s) 104. In this case, since both the base station 102 and mobile station(s) 104 are aware of the mute subframe M, standard HARQ timings may be used, as if no mute subframe M were present.

During a handoff situation, for example, where a mobile station 104 may be unaware of a downlink/uplink resource allocation ratio of a target cell, two-bit signaling in a TDD information element may be used to indicate a downlink/uplink resource allocation ratio, at operation 1550. Alternatively, one-bit signaling may be used in a mobility control information element to indicate a downlink/uplink resource allocation ratio of a target cell during a handoff, if the absence of such signaling represents the same downlink/uplink resource allocation ratio between a source cell and the target cell.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for dynamic adjustment of downlink/uplink resource allocation ratio in a long-term evolution (LTE) time division duplex (TDD) system, comprising:
   replacing at least one of an uplink subframe and a downlink subframe in a first subframe pattern with at least one mute subframe to form a second subframe pattern;
   scheduling a first data transmission in accordance with the second subframe pattern, indicating a first downlink/uplink resource allocation ratio;
   replacing the at least one mute subframe, within the second subframe pattern, with either the uplink subframe or the downlink subframe to form a predetermined third subframe pattern; and
   scheduling a second data transmission in accordance with the predetermined third subframe pattern indicating a second downlink/uplink resource allocation ratio, wherein
   the second subframe pattern is obtained from a lookup table, such that the replacing the mute subframe results in the predetermined third subframe pattern.

2. The method of claim 1, further comprising:
   implementing Hybrid Automatic Repeat-request (HARQ) processing after the at least one of the uplink subframe and the downlink subframe is replaced with the mute subframe to form the second subframe pattern.

3. The method of claim 2, wherein downlink transmission is unscheduled in a subframe that can have an ACK/NAK signal in a mute uplink subframe, when a mobile station is unaware of the mute uplink subframe.

4. The method of claim 2, further comprising:
sending a positive ACK signal regardless of a decoding result in order to stop an uplink transmission during a mute uplink subframe, when a mobile station is unaware of the mute uplink subframe.

5. The method of claim 4, further comprising:
scheduling semi-persistent uplink transmission in one or more subframes that do not pass through the mute uplink subframe.

6. The method of claim 2, further comprising:
signaling to one or more mobile stations the existence of the at least one mute subframe.

7. The method of claim 6, wherein the HARQ processing is implemented by reusing standard downlink HARQ timings, as if no mute subframe were present.

8. The method of claim 6, wherein the HARQ processing is implemented by reusing standard uplink HARQ timings, as if no mute subframe were present, and an ACK/NAK acknowledgement is not transmitted, if the ACK/NAK acknowledgement does not fall into a downlink subframe, and is interpreted as a positive ACK by least one mobile station.

9. The method of claim 6, wherein the signaling comprises:
two-bit signaling in a TDD configuration information element to indicate a downlink/uplink resource allocation ratio.

10. The method of claim 6, wherein the signaling comprises:
two-bit signaling in a mobility control information element to indicate a downlink/uplink resource allocation ratio.

11. The method of claim 10, wherein the signaling comprises:
one-bit signaling in a mobility control information element to indicate a downlink/uplink resource allocation ratio of a target cell during a handoff, if an absence of such signaling represents a same downlink/uplink resource allocation ratio between a source cell and the target cell.

12. The method of claim 2, further comprising:
two-bit signaling in a mobility control information element to indicate a downlink/uplink resource allocation ratio, when a mobile station is unaware of the mute uplink subframe.

13. The method of claim 2, further comprising:
one-bit signaling in a mobility control information element to indicate a downlink/uplink resource allocation ratio of a target cell during a handoff, when a mobile station is unaware of the mute uplink subframe, if an absence of such signaling represents a same downlink/uplink resource allocation ratio between a source cell and the target cell.

14. The method of claim 1, wherein the replacing the at least one mute subframe, within the second subframe pattern, with either the uplink subframe or the downlink subframe to form a third subframe pattern, comprises:
replacing another at least one of the uplink subframe and the downlink subframe with at least one mute subframe in the second subframe pattern;
replacing the other at least one mute subframe in the second subframe pattern with either the uplink subframe or the downlink subframe, wherein
the second subframe pattern after replacing the other at least one of the uplink subframe and the downlink subframe with at least one mute subframe is obtained from the lookup table.

15. A station configured for dynamic adjustment of downlink/uplink resource allocation ratio in a long-term evolution (LTE) time division duplex (TDD) system, comprising:
a processor configured for replacing at least one of an uplink subframe and a downlink subframe in a first subframe pattern with at least one mute subframe to form a second subframe pattern, and replacing the at least one mute subframe, within the second subframe pattern, with either the uplink subframe or the downlink subframe to form a predetermined third subframe pattern; and
a scheduler configured for scheduling a first data transmission in accordance with the second subframe pattern, indicating a first downlink/uplink resource allocation ratio, and scheduling a second data transmission in accordance with the predetermined third subframe pattern indicating a second downlink/uplink resource allocation ratio, wherein
the second subframe pattern is obtained from a lookup table, such that the replacing the mute subframe results in the predetermined third subframe pattern.

16. The station of claim 15, further comprising:
a HARQ processor configured for implementing Hybrid Automatic Repeat-request (HARQ) processing after the at least one of the uplink subframe and the downlink subframe is replaced with the mute subframe in the first subframe pattern.

17. The station of claim 16, wherein downlink transmission is unscheduled in a subframe that can have an ACK/NAK signal in a mute uplink subframe, when a mobile station is unaware of the mute uplink subframe.

18. The station of claim 16, further comprising:
a transceiver sending a positive ACK signal regardless of a decoding result in order to stop an uplink transmission during a mute uplink subframe, when a mobile station is unaware of the mute uplink subframe.

19. The station of claim 18, wherein:
the scheduler is further configured to scheduling semi-persistent uplink transmission in one or more subframes that do not pass through the mute uplink subframe.

20. The station of claim 16, further comprising:
a transceiver configured for signaling to one or more mobile stations the existence of the at least one mute subframe.

21. The station of claim 20, wherein the HARQ processing is implemented by reusing standard downlink HARQ timings, as if no mute subframe were present.

22. The station of claim 20, wherein the HARQ processing is implemented by reusing standard uplink HARQ timings, as if no mute subframe were present, and an ACK/NAK acknowledgement is not transmitted, if the ACK/NAK acknowledgement does not fall into a downlink subframe, and is interpreted as a positive ACK by least one mobile station.

23. The station of claim 20, wherein the signaling comprises:
a transceiver configured for two-bit signaling in a TDD configuration information element to indicate a downlink/uplink resource allocation ratio.

24. The station of claim 20, wherein the signaling comprises:
a transceiver configured for one-bit signaling in a mobility control information element to indicate a downlink/uplink resource allocation ratio of a target cell during a handoff, if the absence of such signaling represents a same downlink/uplink resource allocation ratio between a source cell and the target cell.

25. The station of claim 20, wherein the signaling comprises:
a transceiver configured for two-bit signaling in a mobility control information element to indicate a downlink/uplink resource allocation ratio.

26. The station of claim 16, further comprising:
a transceiver configured for two-bit signaling in a mobility control information element to indicate a downlink/uplink resource allocation ratio, when a mobile station is unaware of the mute uplink subframe.

27. The station of claim 16, further comprising:
a transceiver configured for one-bit signaling in a mobility control information element to indicate a downlink/uplink resource allocation ratio of a target cell during a handoff, when a mobile station is unaware of the mute uplink subframe, if the absence of such signaling represents a same downlink/uplink resource allocation ratio between a source cell and the target cell.

28. The station of claim 15, wherein:
the processor is further configured for replacing another at least one of the uplink subframe and the downlink subframe with at least one mute subframe in the second subframe pattern, and replacing the other at least one mute subframe in the second subframe pattern with either the uplink subframe or the downlink subframe, wherein
the second subframe pattern after replacing the other at least one of the uplink subframe and the downlink subframe with at least one mute subframe is obtained from the lookup table.

29. The station of claim 15, where the station is a base station.

30. A computer-readable storage medium storing instructions thereon performing a method dynamic adjustment of downlink/uplink resource allocation ratio in a long-term evolution (LTE) time division duplex (TDD) system, the method comprising:
replacing at least one of an uplink subframe and a downlink subframe in a first subframe pattern with at least one mute subframe to form a second subframe pattern;
scheduling a first data transmission in accordance with the second subframe pattern, indicating a first downlink/uplink resource allocation ratio;
replacing the at least one mute subframe, within the second subframe pattern, with either the uplink subframe or the downlink subframe to form a predetermined third subframe pattern; and
scheduling a second data transmission in accordance with the predetermined third subframe pattern indicating a second downlink/uplink resource allocation ratio, wherein
the second subframe pattern is obtained from a lookup table, such that the replacing the mute subframe results in the predetermined third subframe pattern.

31. The computer-readable storage medium of claim 30, the method further comprising:
implementing Hybrid Automatic Repeat-request (HARQ) processing after the at least one of the uplink subframe and the downlink subframe is replaced with the mute subframe in the first subframe pattern.

32. The computer-readable storage medium of claim 31, wherein downlink transmission is unscheduled in a subframe that can have an ACK/NAK signal in a mute uplink subframe, when a mobile station is unaware of the mute uplink subframe.

33. The computer-readable storage medium of claim 31, the method further comprising:
sending a positive ACK signal regardless of a decoding result in order to stop an uplink transmission during a mute uplink subframe, when a mobile station is unaware of the mute uplink subframe.

34. The computer-readable storage medium of claim 33, the method further comprising:
scheduling semi-persistent uplink transmission in one or more subframes that do not pass through the mute uplink subframe.

35. The computer-readable storage medium of claim 31, the method further comprising:
signaling to one or more mobile stations the existence of the at least one mute subframe.

36. The computer-readable storage medium of claim 35, wherein the HARQ processing is implemented by reusing standard downlink HARQ timings, as if no mute subframe were present.

37. The computer-readable storage medium of claim 35, wherein the HARQ processing is implemented by reusing standard uplink HARQ timings, as if no mute subframe were present, and an ACK/NAK acknowledgement is not transmitted, if the ACK/NAK acknowledgement does not fall into a downlink subframe, and is interpreted as a positive ACK by least one mobile station.

38. The computer-readable storage medium of claim 35, wherein the signaling comprises:
two-bit signaling in a TDD configuration information element to indicate a downlink/uplink resource allocation ratio.

39. The computer-readable storage medium of claim 38, wherein the signaling comprises:
one-bit signaling in a mobility control information element to indicate a downlink/uplink resource allocation ratio of a target cell during a handoff, if the absence of such signaling represents a same downlink/uplink resource allocation ratios between a source cell and the target cell.

40. The computer-readable storage medium of claim 35, wherein the signaling comprises:
two-bit signaling in a mobility control information element to indicate a downlink/uplink resource allocation ratio.

41. The computer-readable storage medium of claim 31, the method further comprising:
two-bit signaling in a mobility control information element to indicate a downlink/uplink resource allocation ratio, when a mobile station is unaware of the mute uplink subframe.

42. The computer-readable storage medium of claim 31, the method further comprising:
one-bit signaling in a mobility control information element to indicate a downlink/uplink resource allocation ratio of a target cell during a handoff, when a mobile station is unaware of the mute uplink subframe, if the absence of such signaling represents a same downlink/uplink resource allocation ratios between a source cell and the target cell.

43. The computer-readable storage medium of claim 30, wherein the replacing the at least one mute subframe, within the second subframe pattern, with either the uplink subframe or the downlink subframe to form a third subframe pattern, comprises:
replacing another at least one of the uplink subframe and the downlink subframe with at least one mute subframe in the second subframe pattern;
replacing the other at least one mute subframe in the second subframe pattern with either the uplink subframe or the downlink subframe, wherein
the second subframe pattern after replacing the other at least one of the uplink subframe and the downlink subframe with at least one mute subframe is obtained from the lookup table.

* * * * *